(12) United States Patent
Kristiansen et al.

(10) Patent No.: US 7,575,703 B2
(45) Date of Patent: Aug. 18, 2009

(54) POLYMER GEL-PROCESSING TECHNIQUES AND HIGH MODULUS PRODUCTS

(75) Inventors: Magnus Kristiansen, Zurich (CH); Theo Tervoort, Zurich (CH); Paul Smith, Zurich (CH)

(73) Assignee: Eidgenössische Technische Hochschule Zürich, Zurich (CH)

( * ) Notice: Subject to any disclaimer, the term of this patent is extended or adjusted under 35 U.S.C. 154(b) by 850 days.

(21) Appl. No.: 10/785,418

(22) Filed: Feb. 25, 2004

(65) Prior Publication Data

US 2007/0007688 A1 Jan. 11, 2007

Related U.S. Application Data

(60) Provisional application No. 60/449,616, filed on Feb. 26, 2003.

(51) Int. Cl.
*D01F 6/06* (2006.01)
*D01F 6/30* (2006.01)
*D01D 5/12* (2006.01)
*D01D 1/02* (2006.01)

(52) U.S. Cl. ............... 264/210.6; 264/210.8; 264/289.3; 264/290.2; 264/290.5

(58) Field of Classification Search ........... 264/205, 264/208, 178 F, 210.8, 211.14, 290.2, 290.5, 264/235.8, 288.4, 289.3, 210.6
See application file for complete search history.

(56) References Cited

U.S. PATENT DOCUMENTS

| | | | | | |
|---|---|---|---|---|---|
| 3,367,926 A | * | 2/1968 | Voeks | ............... | 524/84 |
| 3,852,237 A | * | 12/1974 | Osborn et al. | ............ | 524/88 |
| 4,016,118 A | * | 4/1977 | Hamada et al. | ............ | 524/108 |
| 4,184,026 A | * | 1/1980 | Carrock et al. | ............ | 523/322 |
| 4,344,908 A | * | 8/1982 | Smith et al. | ............ | 264/203 |
| 4,385,026 A | * | 5/1983 | Barham | ............ | 264/288.4 |
| 4,413,110 A | * | 11/1983 | Kavesh et al. | ............ | 526/348.1 |
| 4,436,689 A | * | 3/1984 | Smith et al. | ............ | 264/204 |
| 4,551,296 A | * | 11/1985 | Kavesh et al. | ............ | 264/203 |
| 4,643,865 A | * | 2/1987 | Okada et al. | ............ | 264/288.4 |
| 4,655,769 A | * | 4/1987 | Zachariades | ............ | 623/1.49 |
| 4,734,196 A | * | 3/1988 | Kono et al. | ............ | 210/500.36 |
| 5,310,950 A | * | 5/1994 | Mannion | ............ | 549/364 |
| 5,479,952 A | * | 1/1996 | Zachariades et al. | ........ | 132/321 |
| 5,573,824 A | * | 11/1996 | Klocek et al. | ............ | 428/38 |
| 6,416,699 B1 | * | 7/2002 | Gownder et al. | ............ | 264/210.8 |
| 6,632,885 B2 | * | 10/2003 | Morizono et al. | ........... | 525/191 |
| 6,780,361 B1 | * | 8/2004 | Sridharan et al. | ........... | 264/205 |
| 6,824,721 B2 | * | 11/2004 | Albe et al. | ............ | 264/210.8 |
| 6,878,327 B2 | * | 4/2005 | Cooper et al. | ............ | 264/210.8 |
| 6,960,635 B2 | * | 11/2005 | Stevens et al. | ............ | 526/161 |

(Continued)

FOREIGN PATENT DOCUMENTS

GB 1 567 365 5/1980

(Continued)

OTHER PUBLICATIONS

JP 05-222236, Aug. 31, 1993, JPO Machine Translation.*

(Continued)

*Primary Examiner*—Eric Hug
(74) *Attorney, Agent, or Firm*—Jones Day

(57) ABSTRACT

The present invention provides polymer gel-processing techniques and polymer articles of high modulus.

30 Claims, 3 Drawing Sheets

U.S. PATENT DOCUMENTS 7,025,919 B2 * 4/2006 Gownder et al. ......... 264/210.8

FOREIGN PATENT DOCUMENTS

| JP | 05 222236 |   | 8/1993 |
| --- | --- | --- | --- |
| JP | 5-222236 | * | 8/1993 |
| JP | 5-222237 | * | 8/1993 |
| JP | 06 057055 |   | 3/1994 |
| JP | 6-57055 | * | 3/1994 |
| JP | 8-12799 | * | 1/1996 |
| JP | 8 12799 |   | 1/1996 |
| JP | 8-239386 | * | 9/1996 |

OTHER PUBLICATIONS

KR 2002004215, Jan. 2002, Choi et al., Derwent Abstract.*
Kristiansen et al., Synergistic gelation of solutions of isotactic polypropylene and bis-(3,4-dimethyl benzylidene) sorbitol and its use in gel-processing, Polymer 44 (2003), pp. 5885-5891.*
International Search Report issued Aug. 19, 2004 for PCT/IB2004/001052.
Kristiansen, Magnus et al., "Synergistic Gelation of Solutions of Isotactic Polypropylene and Bis-(3,4-Dimethyl Benzylidene) Sorbitol and its Use in Gel-Processing", Polymer, Elsevier Science Publishers B.V., GB, vol. 44, No. 19, Sep. 2003, pp. 5885-5891.

* cited by examiner

POLYMER GEL-PROCESSING TECHNIQUES AND HIGH MODULUS PRODUCTS

CROSS-REFERENCE TO RELATED APPLICATIONS

This application claims the benefit of U.S. provisional application 60/449,616, filed on Feb. 26, 2003, which is hereby incorporated in its entirety by reference.

FIELD OF THE INVENTION

The present invention relates to a method of gel-processing polymers and to high modulus polymer products.

BACKGROUND OF THE INVENTION

Convenient gel-processing techniques have been developed for polyethylene to provide articles (e.g. fibers and films) of good mechanical properties. See, e.g., U.S. Pat. No. 4,422,993, which is hereby incorporated in its entirety by reference. However, efforts to employ gel-processing techniques to provide polypropylene articles of good mechanical properties have, at best, only seen moderate success and/or lead to cumbersome processing schemes. See, e.g., Bastiaansen et al., "Makromol Chem Macromol. Symp." 1989, 28:73; Peguy et al., "Polym Commun", 1984, 25:39; Matsuo et al., "Polym J", 1986, 18:759; Ohta et al., "Polymer", 1998, 20:4793; and U.S. Pat. No. 4,413,110. Particularly, the processing techniques appear to be impractically slow, therewith preventing fiber production on an industrial scale.

For instance, referring to the literature mentioned above, Peguy et al. describes the formation of gel-films by quenching hot solutions of polypropylene (hereinafter also referred to as "PP") in decalin to −25° C. and leaving the material for several hours. Ohta et al. mentions the method of pressing "gel-like spherulites", which were prepared at a cooling rate as low as 1.5° C./min. U.S. Pat. No. 4,413,110 reports producing gel-fibers of PP by extruding 8 wt % solutions of the polymer in paraffin oil and extracting the latter with trichlorotrifloroethane at a speed of only about 6 m/min.

The lack of a convenient process to convert PP into high-performance products is unfortunate because, even though the theoretical ultimate stiffness and strength of PP are mentioned to be somewhat lower than those of polyethylene (e.g., Kausch in "Polymer Fracture", Springer Berlin, 1992, p. 6), the significantly higher melting temperature of PP, especially when constrained (Bastiaansen et al. in "Makromol. Chem. Macromol. Symp.", 1989, 28:73), would provide distinct advantages over polyethylene.

References mentioning employing polyolefins in the formation of porous membranes include U.S. Pat. No. 6,632,850 (which is hereby incorporated in its entirety by reference); JP-A-08012799; JP-A-05222236; and JP-A-09003226.

The article by Kristiansen et al. in the journal "Polymer", vol. 44, p. 5885-5891 (2003) mentions isotactic polypropylene and the nucleating agent DMDBS.

Objectives of the present invention include providing polymer gel-processing techniques with reduced gelling times and providing polymer articles of high modulus.

SUMMARY OF THE INVENTION

The present invention provides improved gel-processing techniques. In one embodiment, the present invention provides a process comprising:

(a) dissolving a polymer in a solvent to form a polymer solution, wherein said polymer solution further comprises one or more nucleating agents;
(b) gelling said polymer solution to form a gel-processed polymer;
(c) optionally, removing at least part of said solvent from said gel-processed polymer;
(d) drawing said gel-processed polymer.

Also, the present invention provides polymer articles of high modulus, including articles produced with polymers of moderate molecular weight. In one embodiment, the present invention provides a polypropylene fiber, wherein (a) the weight average molecular weight of the polypropylene used to produce said fiber is less than 750,000 g/mol; and
(b) said fiber has a Young's modulus of at least 15 GPa.

Additional objects, advantages and features of the present invention are set forth in this specification, and in part will become apparent to those skilled in the art on examination of the following, or may be learned by practice of the invention. The inventions disclosed in this application are not limited to any particular set of or combination of objects, advantages and features. It is contemplated that various combinations of the stated objects, advantages and features make up the inventions disclosed in this application.

DETAILED DESCRIPTION OF THE INVENTION

Figure 1:
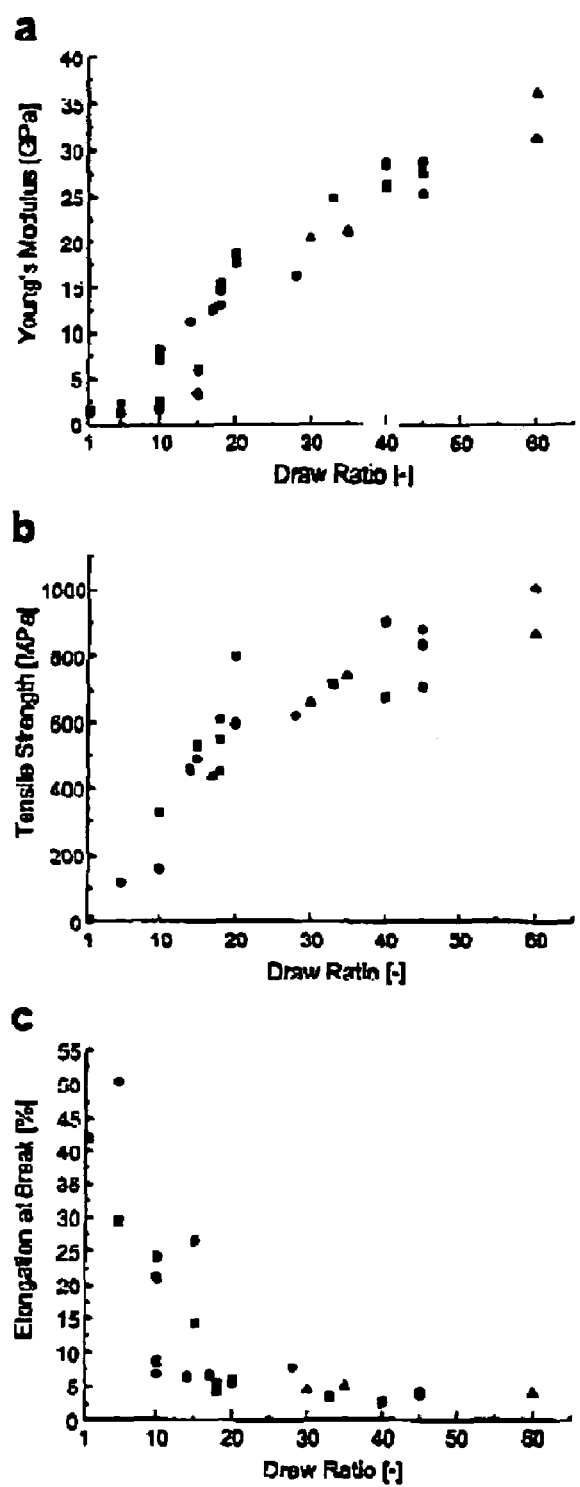
FIG. 1: Graphs of Young's modulus (a), tensile strength (b) and elongation at break (c) as a function of draw ratio for PP samples prepared by DMDBS-assisted gel-processing/drawing. In the diagrams the symbols refer to the following concentrations: triangles=2.5 wt % PP/0.0125 wt % DMDBS; squares=3.0 wt % PP/0.015 wt % DMDBS; and circles=4.0 wt % PP/0.02 wt % DMDBS.

Preliminarily: Although the present gel-processing technique are illustrated primarily in reference to isotactic polypropylene, the invention set forth herein is not limited to isotactic propylene and includes other (semi-)crystalline polymers, for instance polyethylene and copolymers thereof, polyisoprene, polybutadiene, cyclic polyolefins, poly(vinylalcohol) and copolymers thereof, natural polymers such as starch, polyamides, polyesters, polyacetals such as polyoxymethylene, polyketones, polystyrenes, fluorinated polymers, conjugated polymers including but not limited to substituted and unsubstituted polyacetylene, polythiophenes, polyaniline, and the like, and copolymers and blends thereof.

The present invention provides a gel-processing technique for polymers. In one embodiment, the present invention provides a method comprising gel-processing a polypropylene polymer with the use of nucleating agents.

Gel-processing

In the present process, one or more polymers are dissolved in a solvent, for instance at elevated temperatures, to form a polymer solution. In addition, an effective amount of one or more nucleating agents are present in the polymer solution. In one embodiment, the one or more polymers are dissolved in the solvent at a temperature of at least 50° C., for instance at least 100° C., at least 125° C., at least 150° C., or at least 175° C. In one embodiment, the one or more polymers are dissolved at a temperature of less than 300° C., for instance less than 250° C. or less than 200° C., less than 190° C., or less than 180° C. In one embodiment, the one or more polymers are dissolved below the melting temperatures of the one or more polymers, for instance at least 10° C., at least 20° C., at least 30° C., or at least 40° C. below the melting temperature of the one or more polymers. In one embodiment, the polymer solution further includes additives, for instance dyes, cross-linking agents, UV stabilizers, antioxidants, and the like.

The polymer solution is then gelled, for instance by cooling the solution and/or by extracting part or all of the solvent. Although not wishing to be limited by any particular theory, the gelling of the solution is attributed to the formation of polymer crystallites upon cooling/extraction, resulting in an elastic coherent mass (a gel), often having a turbid appearance.

In one embodiment, the gels are shaped (for instance in fiber or film shape), e.g. by extruding the polymer solution through appropriate dies and then cooling the solution and/or quenching the solution in an extraction bath.

In one embodiment, part or all of the solvent in the gels is removed prior to further processing the gel into, for instance, drawn films or fibers. In another embodiment, part or all of the solvent in the gels is removed during further processing the gel into, for instance, drawn films or fibers. Examples of methods to remove the solvent include, for instance, evaporation and extraction. See also U.S. Pat. Nos. 4,422,993, and 4,413,110, which are hereby incorporated in their entirety by reference.

In one embodiment, the gel (also referred to as "the gel-processed polymer") is stretched (drawn) in a multi-stage stretching process. For instance, in one embodiment, the stretching process comprises stretching the gel-processed polymer to a first draw ratio at a first temperature (e.g. in the range of 80-130° C., for instance 110-125° C.) and to a second draw ratio at a second temperature (e.g. between 130 and 160° C.). In another embodiment, the stretching process comprises stretching the gel-processed polymer to a third draw ratio at a third temperature, e.g. about 160-about 175° C. In one embodiment, the stretching process is a uniaxial stretching process. In another embodiment, the stretching process is a multidirectional stretching process, e.g. a biaxial stretching process.

In one embodiment, the gel-processed polymer is drawn to a draw ratio $\lambda$ (final length divided by initial length) of at least 15, for instance at least 20, at least 30, at least 40, at least 50, or at least 60.

In one (biaxial) drawing embodiment, the gel-processed polymer is drawn at least 2×2 times, e.g. at least 4×4 times or at least 6×6 times.

In one embodiment, the drawn, gel-processed polymer has a Young's modulus of at least 10 GPa, for instance at least 15 GPa, at least 20 GPa, at least 25 GPa, at least 30 GPa, or at least 35 GPa.

In one embodiment, the drawn, gel-processed polymer has a tensile strength of at least 0.5 GPa, for instance at least 0.6 GPa, at least 0.7 GPa, at least 0.8 GPa, at least 0.9 GPa, or at least 1.0 GPa.

In one embodiment, the drawn, gel-processed polymer has a peak melting temperature under constrained conditions (See Example section infra) of at least 170° C., for instance at least 185° C., at least 195° C., at least 205° C., at least 215° C. or at least 225° C. The peak melting temperature is generally below 275° C.

In one embodiment, the drawn films and fibers, or other products resulting from the processes according to the present invention, are post treated, for instance annealed, surface treated, or cross-linked, or embedded into a matrix.

Polymer

In a preferred embodiment, the polymers for use in the present invention are substantially comprised of (isotactic) propylene. It is also contemplated according to the present invention that the polymer may comprise an amount of co-monomer, for instance up to 10 percent by weight, up to 5 percent by weight, or up to 2 percent by weight. Examples of co-monomers include, for instance, monoolefins containing 2 to about 12 carbon atoms (e.g. 2-8 or 2-6 carbon atoms), vinyl acetate, maleic anhydride, and the like.

In one embodiment, the polymer is of a weight average molecular weight (Mw) of at least 50,000 g/mol, for instance at least 100,000 g/mol, at least 250,000 g/mol, or at least 400,000 g/mol. In a further embodiment the weight average molecular weight of the polymer is less than 750,000 g/mol, for instance less than 700,000 g/mol, less than 600,000 g/mol, less than 500,000 g/mol, or less than 490,000 g/mol. In another embodiment, the weight average molecular weight is at least 750,000 g/mol, for instance at least 1,000,000 g/mol or at least 2,000,000 g/mol. Generally, the molecular weight is below 15,000,000 g/mol.

In one embodiment, the polymer is of a number average molecular weight (Mn) of at least 10,000 g/mol, for instance at least 20,000 g/mol, at least 50,000 g/mol, or at least 70,000 g/mol. In a further embodiment, the number average molecular weight of the polymer is less than 750,000 g/mol, for instance less than 700,000 g/mol, less than 600,000 g/mol, less than 500,000 g/mol, or less than 490,000 g/mol. In another embodiment, the number average molecular weight is at least 50,000 g/mol, for instance at least 100,000 g/mol or at least than 200,000 g/mol. Generally, the molecular weight is below 15,000,000 g/mol.

In one embodiment, the polydispersity (Mw/Mn) is less than 100, for instance less than 50, less than 20, less than 15, less than 10, less than 8, less than 7, or less than 6. The polydispersity is 1 or more, e.g. at least 2 or at least 3.

The polymer concentration in the polymer solution may vary and may to an extent depend on the molecular weight of the polymer used. In one embodiment, lower concentrations are preferred for polymers of higher molecular weights to facilitate extrusion. Also, although not always, higher maximum draw ratios may be obtained for fibers/films prepared from solutions of lower polymer content.

In one embodiment, the polymer solution comprises, relative to the total weight of solvent, less than 150 weight percent of polymer, for instance less than 100 weight percent, less than 75 weight percent, less than 50 weight percent, less than 35 weight percent, less than 25 weight percent, less than 20 weight percent, less than 15 weight percent, less than 12 weight percent, less than 10 weight percent, less than 8 weight percent, or less than 6 weight percent. Generally, the polymer solution comprises, relative to the total weight of solvent, at least 0.5 weight percent polymer, for instance at least 1 weight percent polymer or at least 2 weight percent polymer. In one embodiment, the polymer solution comprises, relative to the total weight of solvent, at least 5 weight percent of polymer, e.g. at least 10 weight percent, at least 20 weight percent, or at least 30 weight percent of polymer.

Nucleating Agent

A wide variety of nucleating agents may be employed in the present invention. Examples of nucleating agents include, for example inorganic substances, such as talcum, metal oxides, such as titanium dioxide or magnesium oxide, phosphates, carbonates or sulfates of, preferably, alkaline earth metals; organic compounds, such as mono- or polycarboxylic acids and the salts thereof, e.g. 4-tert-butylbenzoic acid, adipic acid, diphenylacetic acid, sodium succinate or sodium benzoate; polymeric compounds, such as ionic copolymers (ionomers). Further examples of nucleating agents include those based on sorbitol, for instance 1,3-2,4-di(benzylidene)-D-sorbitol (MILLAD 3905, Milliken Chemical Co.; IRGA-CLEAR D, Ciba Specialty Chemicals); 1,3-2,4-di(4-tolylidene)-D-sorbitol (MILLAD 3940, Milliken Chemical Co.; NC6, Mitsui Petrochemical Industries, Ltd.); 1,3-2,4-(3, 4-dimethylbenzylidene)-D-sorbitol (MILLAD 3988, Milliken Chemical Co.); 1,3-2,4-di(4-ethylbenzylidene)-D-sorbitol (NC-4, Mitsui Petrochemical Industries, Ltd.). Further examples of nucleating agents include tricarballytic acid type amide compounds described in JP-A-Hei 7/278,374, trimesic acid derivatives disclosed in EP-A-940,431 and JP-A-Hei 06/192,496, and the like. Also, examples of nucleating agents include those based upon salts of phosphoric acid, for example, 2,2'-methylen-bis-(4,6-di-tert-butylphenyl)phosphate (ADEKA STAB NA11 and ADEKA STAB NA21, Asahi Denka Kogyo), upon salts of carboxylic acid, for example sodium benzoate, upon carboxy-aluminum-hydroxides such as aluminum hydroxy-bis[4-(tert butyl)benzoate] (SANDOSTAB 4030, Clariant GmbH), upon salts of rosin/adiebetic acid (PINECRYSTAL KM-1300, PINECRYSTAL KM-1600, Arakawa Chemical Industries, Ltd.). Even further examples include zinc (II) monoglycerolate (PRIFER 3888, PRIFER 3881), and di-sodium salt of cis-endo-bicyclo(2.2.1) heptane 2,3-dicarboxylic acid (HYPERFORM HPN 68, Milliken Chemical Co.). A further example is N,N'-dicyclohexyl-2,6-naphthalene carboxamide ("NU-100", New Japan Chemical). In one embodiment, alpha nucleating agents are employed. In another embodiment, beta nucleating agents are employed. Also, mixtures of, e.g., alpha and beta nucleating agents may be employed. Preferred nucleating agents include those that dissolve (at least partly) in the polymer solution.

The concentration of nucleating agent in the polymer solution may vary. In one embodiment, the concentration of nucleating agent in the polymer solution is, relative to the total weight of solvent, less than 5 weight percent, for instance less than 3 weight percent, less than 1 weight percent, or less than 0.5 weight percent. Advantageously and surprisingly, the present gel-processing technique allows embodiments employing even lower concentrations, for instance less than 0.25 weight percent, less than 0.15 weight percent, less than 0.1 weight percent, less than 0.075 weight percent, less than 0.05 weight percent, less than 0.025, or even less than 0.010 weight percent of one or more nucleating agents. In one embodiment, the polymer solution comprises, relative to the total weight of solvent, at least 0.001 weight percent of one or more nucleating agents.

In one embodiment, at least part of the one or more nucleating agents are recovered from the gels. In another embodiment, for instance in embodiments where the one or more nucleating agents are present in only very small amounts, the one or more nucleating agents are left in the finished, gel-processed polymer products.

Solvent

In one embodiment, the solvent used is decalin (decahydronaphthalene). Further examples of solvents include, e.g., mineral oils or paraffin oils. The solvent may be a mixture of solvents. The appropriate solvent for an embodiment (as well as the process of solvent removal) will be readily determinable by those skilled in the art of gel-processing having the benefit of the present invention.

Product

The polymers may be gel-processed into a variety of articles, including films, fibers, foams, sheets, tubes, nonwoven fabrics, and the like, and may be advantageously used in a variety of products. For example, marine ropes and cables, such as the mooring lines used to secure supertankers to loading stations and the cables used to secure deep sea drilling platforms to underwater anchorage, are presently constructed of materials such as nylon, polyester, aramids and steel which are subject to hydrolytic or corrosive attack by sea water. Consequently, such mooring lines and cables are typically constructed with significant safety factors and/or are replaced frequently. The significant weight and the need for frequent replacement create substantial operational and economic burdens. The products according to the present invention may be used to address these concerns. Other applications for the fibers and films of this invention include reinforcements in thermoplastics (including propylene polymers), thermosetting resins, elastomers, and concrete. The reinforced materials may be used, for instance, in or as pressure vessels, hoses, sails, power transmission belts, anti-ballistic products such as bullet-proof vests and panels, sports and automotive equipment, or building construction. Further examples of applications, for instance for multiaxially stretched films according to the present invention, include porous membranes.

EXAMPLES

The following examples are given as particular embodiments of the invention and to demonstrate the practice and advantages thereof. It is understood that the examples are given by way of illustration only and are not intended to limit the specification or the claims that follow in any matter.

Unless indicated otherwise, all polymer weight percentages mentioned in the examples are relative to the total weight of the polymer solution and all nucleating agent weight percentages are relative to the total weight of solvent.

Materials

Polymer: Unless indicated otherwise, the polymer used was isotactic polypropylene having a viscosity-average molecular weight, measured in tetralin at 135° C., of $1.3 \times 10^6$ g/mol. Nucleating agent: Unless indicated otherwise, the nucleating agent used was 1,3:2,4-bis-(3,4-dimethyl benzylidene) sorbitol ("DMDBS", MILLAD 3988, Milliken Chemical, Belgium). Antioxidant: the antioxidant used was tetra [3-(3,5-di-t-butyl-4-hydroxyphenyl) propionate] (IRGANOX 1010, Ciba Specialty Chemicals, Switzerland). Solvent: the solvent used was decalin (decahydronaphthalene, cis/trans isomeric mixture, purchased from Fluka AG). All materials were used as received.

Test Methods

Mechanical Properties. Tensile strength, Young's modulus, and elongation to break were determined from stress-strain curves obtained by tensile testing at room temperature (23° C.) using Instron tensile testers (models 4464 and 4411). The initial sample length was 100 mm and the cross-head speed was 100 mm/min.

Thermal Analysis. Differential scanning calorimetry (DSC, Perkin Elmer DSC-7 Instrument) was used to determine the melting temperatures of drawn samples both under unconstrained and constrained conditions. For determination of melting temperatures of material under constrained conditions, specimens (100 mm length) were wound around a thin copper wire and the thus obtained assembly was placed into a sample pan for DSC measurement. Melting temperatures reported for unconstrained material were determined on samples that were cut to a length of about 2-3 mm and directly placed in a DSC sample pan (i.e. without winding around a copper wire). The DSC thermograms were recorded at a heating rate of 10° C./min and under nitrogen atmosphere. The melting temperatures referred to herein are the temperatures corresponding to the highest peak in the DSC thermograms.

Comparative Example A

DMDBS/Decalin

DMDBS/decalin solutions were prepared by dissolving, in a glass tube, a particular amount (See Table below, wt % relative to the total weight of decalin) of DMDBS in 20 mL of decalin at a temperature between 150 and 185° C., with the higher temperatures being used for higher concentrations of DMDBS to achieve complete dissolution (in particular for concentrations exceeding 0.4 wt %). Subsequently, the thus obtained homogeneous solutions were allowed to cool down to room temperature. Rapid gel formation was observed upon cooling solutions containing DMDBS at concentrations of 0.1 wt % and more. At DMDBS concentrations below 0.075 wt % no gelation was observed upon cooling the decalin solutions down to room temperature.

TABLE 1

DMDBS/Decalin

| No. | DMDBS (wt %) | Gelation |
|---|---|---|
| 1 | 0.025 | No |
| 2 | 0.05 | No |
| 3 | 0.075 | No |
| 4 | 0.1 | Yes |
| 5 | 0.125 | Yes |
| 6 | 0.15 | Yes |
| 7 | 0.4 | Yes |
| 8 | 0.7 | Yes |

Comparative Example B

PP/Decalin

PP/decalin solutions were prepared by mixing, in an Erlenmeyer, a particular amount (See Table 2 below) of PP in 100 mL of decalin along with 0.5 wt % (relative to the weight of PP) antioxidant. The thus prepared mixture was flushed several times with nitrogen and degassed for 30-45 min under vacuum. Subsequently, the mixture was heated to 160-175° C. under nitrogen and held for 30 min under stirring, resulting in a clear, homogeneous polymer solution. The thus obtained polymer solution was maintained for another 10 min at the same temperature and then poured into aluminum trays (which were at room temperature). The thickness of the resultant polymer solution layer in the tray was in the range of about 5-10 mm.

Cooling of these solutions in the aluminum trays resulted in (weak) gels after a period of time exceeding 30 min. The decalin was removed from the gels in the aluminum tray by allowing the solvent to evaporate during 24-48 hrs at room temperature. Removal of the solvent from gels formed from solutions containing 4 wt % or less PP resulted in "mud-cracked", brittle films. Gels produced from solutions containing 5 wt % of PP consistently yielded coherent, ductile films.

TABLE 2

PP/Decalin

| No. | PP (wt %) | Gelation | Gelation time | Film quality after evaporation of solvent |
|---|---|---|---|---|
| 1 | 1.0 | Yes | >30 min | cracked, brittle |
| 2 | 2.0 | Yes | >30 min | cracked, brittle |
| 3 | 3.0 | Yes | >30 min | cracked, brittle |
| 4 | 4.0 | Yes | >30 min | cracked, brittle |
| 5 | 5.0 | Yes | >30 min | coherent, ductile |

Example 1

PP/DMDBS/Decalin

PP/DMDBS/decalin solutions were prepared by mixing, in an Erlenmeyer, a particular amount (See Table 3 below) of PP and DMDBS in 100 mL of decalin along with 0.5 wt % (relative to the weight of PP) antioxidant. The thus prepared mixture was flushed several times with nitrogen and degassed for 30-45 min under vacuum. Subsequently, the mixture was heated to 160-175° C. under nitrogen and held for 30 min under stirring, resulting in a clear, homogeneous polymer solution. The thus obtained polymer solution was maintained for another 10 min at the same temperature and then poured into aluminum trays (which were at room temperature). The thickness of the resultant polymer solution layer in the tray was in the range of about 5-10 mm.

Cooling of these solutions in the aluminum trays resulted in gels after a period of time of 5 minutes or less, in some cases less than 30 seconds. Also, filaments (about 0.5 mm diameter) drawn from the polymer solution right after pouring the solution in the aluminum tray gelled almost instantaneously upon drawing.

The decalin was removed from the gels in the aluminum tray by allowing the solvent to evaporate during 24-48 hrs at room temperature. Removal of the solvent from gels resulted in coherent, ductile films (hereinafter also referred to as "dried, gel-cast films").

TABLE 3

PP/DMDBS/Decalin

| No. | PP (wt %) | DMDBS (wt %) | Gelation | Gelation time | Film quality after evaporation of solvent |
|---|---|---|---|---|---|
| 1 | 1.0 | 0.1 | Yes | <1 min | coherent, ductile |
| 2 | 1.0 | 0.01 | Yes | n.m. | coherent, ductile |
| 3 | 1.0 | 0.0075 | Yes | n.m. | coherent, ductile |
| 4 | 1.0 | 0.005 | Yes | n.m. | cracked, brittle |

TABLE 3-continued

PP/DMDBS/Decalin

| No. | PP (wt %) | DMDBS (wt %) | Gelation | Gelation time | Film quality after evaporation of solvent |
|---|---|---|---|---|---|
| 5  | 1.0 | 0.0025  | Yes | n.m.    | cracked, brittle |
| 6  | 2.0 | 0.1     | Yes | <1 min  | coherent ductile |
| 7  | 2.0 | 0.02    | Yes | n.m     | coherent ductile |
| 8  | 2.0 | 0.015   | Yes | n.m.    | coherent ductile |
| 9  | 2.0 | 0.01    | Yes | <5 min  | coherent ductile |
| 10 | 2.0 | 0.005   | No  | None    | cracked, brittle |
| 11 | 2.5 | 0.1     | Yes | <1 min  | coherent ductile |
| 12 | 2.5 | 0.025   | Yes | n.m.    | coherent ductile |
| 13 | 2.5 | 0.01875 | Yes | ~1 min  | coherent ductile |
| 14 | 2.5 | 0.0125  | Yes | ~1 min  | coherent ductile |
| 15 | 2.5 | 0.00625 | Yes | ~1 min  | cracked, brittle |
| 16 | 3.0 | 0.1     | Yes | <1 min  | coherent, ductile |
| 17 | 3.0 | 0.03    | Yes | n.m.    | coherent, ductile |
| 18 | 3.0 | 0.0225  | Yes | <2 min  | coherent, ductile |
| 19 | 3.0 | 0.015   | Yes | <2 min  | coherent, ductile |
| 20 | 3.0 | 0.0075  | Yes | <2 min  | coherent, ductile |
| 21 | 4.0 | 0.1     | Yes | <1 min  | coherent, ductile |
| 22 | 4.0 | 0.04    | Yes | n.m.    | coherent, ductile |
| 23 | 4.0 | 0.03    | Yes | <1 min  | coherent, ductile |
| 24 | 4.0 | 0.02    | Yes | ~1 min  | coherent, ductile |
| 25 | 4.0 | 0.01    | Yes | <2 min  | coherent, ductile |
| 26 | 5.0 | 0.1     | Yes | <1 min  | coherent, ductile | n.m. = not measured
Note that the results in Table 3 were obtained with PP of relatively low molecular weight. When polymer grades of higher molecular weights are used, also, for instance films of the compositions 4, 5, 10, 15 may become ductile.

Example 2

Specimens taken from the dried, gel-cast films obtained in Example 1 were drawn. Drawing was performed using rectangular specimens (20 mm long and 2 mm wide) cut from the dried gel-cast films. The specimens were drawn with an Instron tensile-tester (model 4464) equipped with a hot-air oven at temperatures ranging from 90 to 160° C. and at a rate of elongation of 100 mm/min. The draw ratios ($\lambda$=final/initial length) were determined from the separation of ink marks placed 2 mm apart on the specimen prior to drawing.

Figure 2:
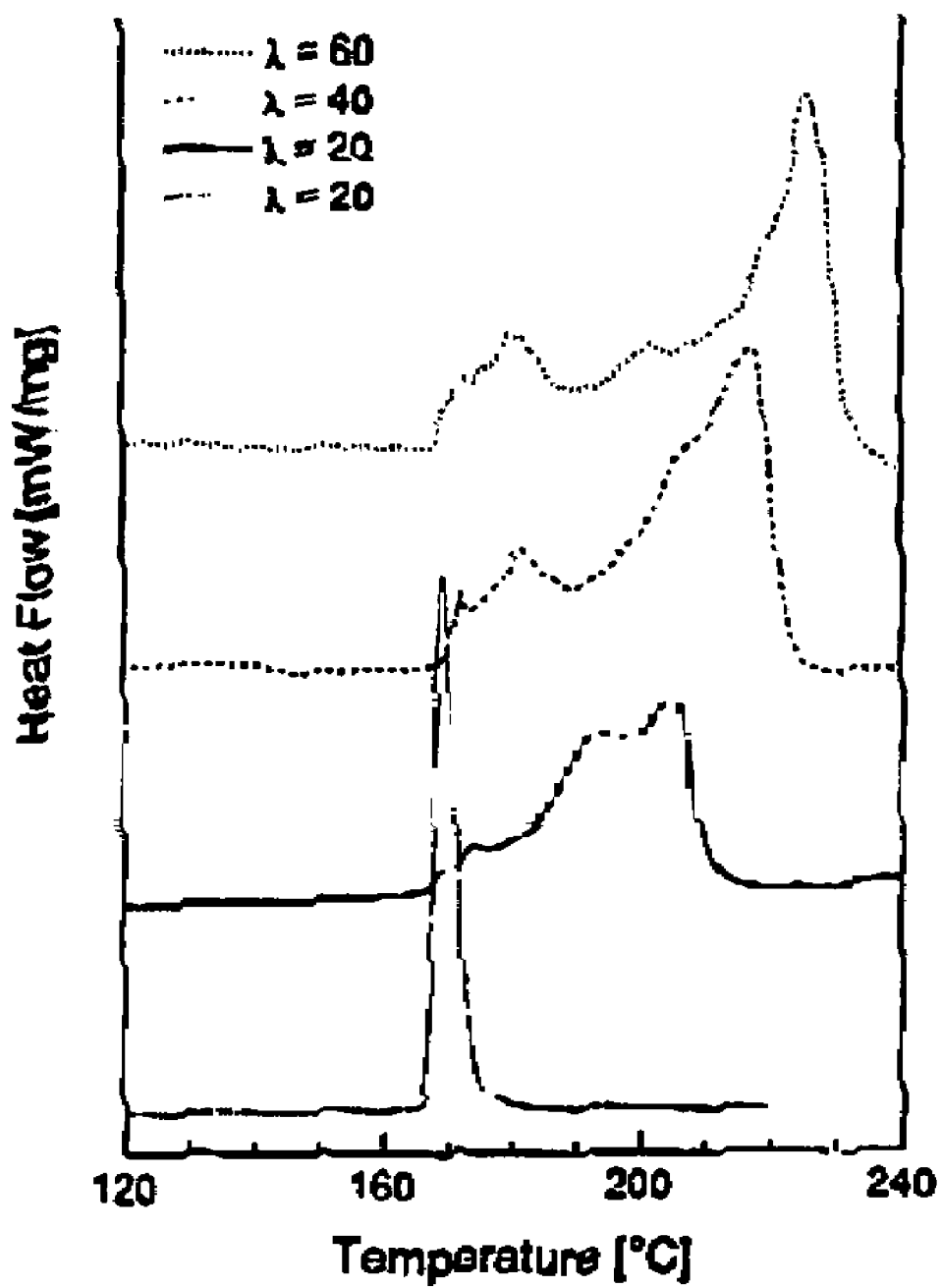
FIG. 2: DSC melting thermograms of gel-processed/drawn PP under constrained (upper 3 thermograms) and unconstrained (bottom thermogram) conditions.

By one-stage drawing at elevated temperatures (120-160° C.), draw ratios up to about 30 or even more were achieved. Draw ratios of 60 or even more were achieved by two-stage drawing. Two-stage drawing was performed by first drawing a specimen to a draw ratio of about 10 to 20 at 120° C., and in a second step drawing the specimen further at a temperature between 130-160° C. The second step drawing was performed with 20 mm samples and a drawing rate of 20 mm/min. The mechanical properties and melting temperatures of drawn specimens are shown in FIGS. 1 and 2.

Example 3

Figure 3:
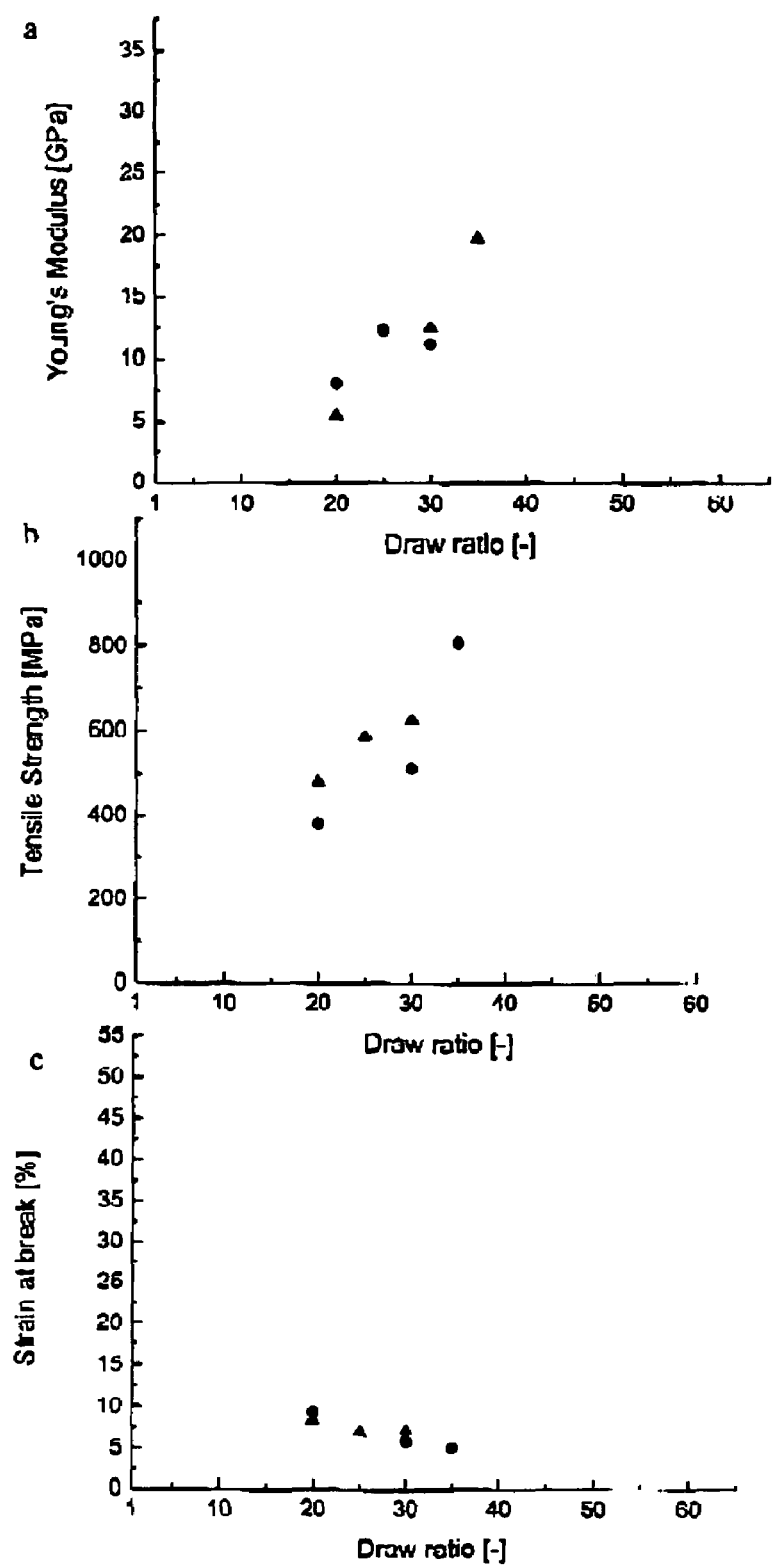
FIG. 3: Graphs of Young's modulus (a), tensile strength (b), and elongation at break (c) as a function of draw ratio.

A dried, gel-cast film was prepared according to the procedure of Example 1, except that a different polypropylene sample was used. The isotactic polypropylene used was grade HA510MO from BOREALIS, having a melt-flow rate (230° C./2.16 kg) of 0.35 g/10 min, which (according to the literature) corresponds to a weight average molecular weight Mw of approximately $400.10^3$-$600.10^3$ g/mol. See "Polymer Handbook", $4^{th}$ Ed., J. Brandrup et al., Wiley, 1999, V/25: and "Polymers—A Property Database", Ed. B. Ellis, Chapman & Hall, London, 2000. The concentration of the HA5010MO and DMDBS were, respectively, 2.0 wt % and 0.011 wt %. Specimens taken from the dried, gel-cast film were drawn according to the procedure of Example 2. The draw ratios and mechanical properties are listed in the graphs of FIG. 3 as triangles.

Example 4

Example 3 was repeated, except that a different nucleating agent was used (N,N'-dicyclohexyl-2,6-naphthalene carboxamide ("NU-100", New Japan Chemical)) and that the concentrations of HA5010MO and NU-100 were, respectively, 1.0 wt % and 0.005 wt %. The draw ratios and mechanical properties are listed in the graphs of FIG. 3 as circles.

What is claimed is:

1. A process comprising:
   (a) dissolving a polymer in a solvent to form a polymer solution, wherein said polymer solution further comprises one or more nucleating agents;
   (b) gelling said polymer solution to form a gel-processed polymer;
   (c) optionally, removing at least part of said solvent from said gel-processed polymer;
   (d) drawing said gel-processed polymer to a draw ratio $\lambda$ of at least 20; and
   wherein said polymer is isotactic polypropylene.

2. The process according to claim 1, wherein said dissolving is effected at a temperature of at least 50° C.

3. The process according to claim 1, wherein said process comprises cooling said polymer solution to effect said gelling.

4. The process according to claim 1, wherein said process comprises extruding said polymer solution to obtain a shaped gel-processed polymer.

5. The process of claim 4, wherein said shaped gel-processed polymer has the form of a fiber or a film.

6. The process according to claim 1, wherein said process comprises removing at least part of said solvent from said gel-processed polymer prior to said drawing.

7. The process according to claim 1, wherein said process comprises removing essentially all said solvent from said gel-processed polymer prior to said drawing.

8. The process according to claim 1, wherein said process comprises removing at least part of said solvent from said gel-processed polymer during said drawing.

9. The process according to claim 1, wherein said removing includes evaporating and/or extracting said solvent.

10. The process of claim 1, wherein said isotactic polypropylene comprises 0-10 weight percent co-monomer.

11. The process according to claim 1, wherein said polymer has a weight average molecular weight below 750,000 g/mol.

12. The process according to claim 1, wherein said polymer has a weight average molecular weight below 600,000 g/mol.

13. The process according to claim 1, wherein said polymer has a weight average molecular weight of at least 750,000 g/mol.

14. The process according to claim 1, wherein said polymer solution comprises less than 35 weight percent, relative to the total weight of said solvent, of said polymer.

15. The process according to claim 1, wherein said polymer solution comprises less than 15 weight percent, relative to the total weight of said solvent, of said polymer.

16. The process according to claim 1, wherein said polymer solution comprises at least 1 weight percent, relative to the total weight of said solvent, of said polymer.

17. The process according to claim 1, wherein said solvent is a mixture of solvents.

18. The process according to claim 1, wherein said solvent includes decalin.

19. The process according to claim 1, wherein said nucleating agent is selected from the group consisting of 1,3-2,4-di(benzylidene)-D-sorbitol; 1,3-2,4-di(4-tolylidene)-D-sorbitol; 1,3-2,4-(3,4-dimethylbenzylidene)-D-sorbitol; 1,3-2,4-di(4-ethylbenzylidene)-D-sorbitol; tricarballytic acid-type amide compounds; trimesic acidderivatives; 2,2'-methylen-bis-(4,6-di-tert-butylphenyl)phosphate; sodium benzoate; aluminum hydroxy-bis [4-(tert-butyl)benzoate]; rosin/adiebetic acid salts; zinc(II) monoglycerolate; and the di-sodium salt of cis-endo-bicyclo(2.2.1)heptane 2,3-dicarboxylic acid.

20. The process according to claim 1, wherein said one or more nucleating agents are at least partly dissolved in said polymer solution.

21. The process according to claim 1, wherein said polymer solution comprises, relative to the total weight of solvent in said polymer solution, less than 0.25 wt % of said one or more nucleating agents.

22. The process according to claim 1, wherein said polymer solution comprises, relative to the total weight of solvent in said polymer solution, less than 0.1 wt % of said one or more nucleating agents.

23. The process according to claim 1, wherein said polymer solution comprises, relative to the total weight of solvent in said polymer solution, less than 0.05 wt % of said one or more nucleating agents.

24. The process according to claim 1, wherein said draw ratio $\lambda$ of at least 20 is obtained via a multi-stage drawing process.

25. The process according to claim 1, wherein said draw ratio $\lambda$ is at least 40.

26. The process according to claim 1, wherein said draw ratio $\lambda$ is at least 60.

27. The process according to claim 1, wherein said polymer solution comprises, relative to the total weight of solvent in said polymer solution, less than 0.025 wt % of said one or more nucleating agents.

28. A process comprising:
  (a) dissolving isotactic polypropylene in a solvent to form a polymer solution, wherein
    (i) said polymer solution further comprises one or more nucleating agents selected from the group consisting of 1,3-2,4-di(benzylidene)-D-sorbitol; 1,3-2,4-di(4-tolylidene)-D-sorbitol; 1,3-2,4-(3,4-dimethylbenzylidene)-D-sorbitol; 1,3-2,4-di(4-ethylbenzylidene)-D-sorbitol; tricarballytic acid-type amide compounds; trimesic acidderivatives; 2,2'-methylen-bis-(4,6-di-tert-butylphenyl)phosphate; sodium benzoate; aluminum hydroxy-bis [4-(tert-butyl)benzoate]; rosin/adiebetic acid salts; zinc(II) monoglycerolate; and the di-sodium salt of cis-endo-bicyclo(2.2.1)heptane 2,3-dicarboxylic acid; and
    (ii) the total amount of nucleating agents in said polymer solution is, relative to the total weight of solvent in said polymer solution, less than 0.1 weight percent;
  (b) gelling said polymer solution to form a gel-processed polymer;
  (c) optionally, removing at least part of said solvent from said gel-processed polymer;
  (d) drawing said gel-processed polymer.

29. The process according to claim 28, wherein said process comprises biaxial drawing.

30. The process according to claim 28, wherein the total amount of nucleating agents in said polymer solution, relative to the total weight of solvent in said composition, is less than 0.05 weight percent.

\* \* \* \* \*